(12) United States Patent (10) Patent No.: US 12,647,442 B2

Markh (45) Date of Patent: Jun. 2, 2026

(54) SYSTEM AND METHOD FOR PERFORMING DEVICE ATTESTATION

(71) Applicant: Visa International Service Association, San Francisco, CA (US)

(72) Inventor: John Markh, Burlington (CA)

(73) Assignee: Visa International Service Association, San Francisco, CA (US)

( * ) Notice: Subject to any disclaimer, the term of this patent is extended or adjusted under 35 U.S.C. 154(b) by 439 days.

(21) Appl. No.: 17/719,282

(22) Filed: Apr. 12, 2022

(65) Prior Publication Data

US 2023/0328092 A1 Oct. 12, 2023

(51) Int. Cl.

| *H04L 9/40* | (2022.01) |
| *G06F 11/30* | (2006.01) |
| *G06F 21/57* | (2013.01) |
| *G06F 21/64* | (2013.01) |

(52) U.S. Cl.

CPC ...... *H04L 63/1433* (2013.01); *G06F 11/3089* (2013.01); *G06F 21/57* (2013.01); *G06F 21/64* (2013.01)

(58) Field of Classification Search

CPC .. H04L 63/1433; G06F 11/3089; G06F 21/57; G06F 21/64

See application file for complete search history.

(56) References Cited

U.S. PATENT DOCUMENTS

| 9,075,994 B2 * | 7/2015 | Haikney ................. G06F 21/57 |
| 9,495,544 B2 | 11/2016 | Aissi et al. |
| 9,530,009 B2 | 12/2016 | Aissi et al. |
| 9,867,043 B2 | 1/2018 | Aissi |
| 11,240,219 B2 | 2/2022 | Smirnoff et al. |
| 2015/0007262 A1 * | 1/2015 | Aissi ....................... G06F 21/60 726/2 |
| 2017/0230245 A1 * | 8/2017 | Jacquin ................... H04L 41/40 |

(Continued)

OTHER PUBLICATIONS

Trusted Computing Group, TCG Specification Architecture Overview, 2007, TCG Revision 1.4, pp. 1-54 (Year: 2007).*

(Continued)

*Primary Examiner* — Ellen Tran

(74) *Attorney, Agent, or Firm* — Buckley Patent Law LLC; Timothy Emmanuel Buckley

(57) ABSTRACT

In some embodiments, a system includes a processor; and a non-transitory computer readable medium coupled to the processor, the non-transitory computer readable medium including code that: requests, using a device-specific attestation request, a device-specific attestation of a device; receives, via a secure communication channel, device-specific attestation data from the device as a result of the device-specific attestation; and generates an enhanced attestation object based on the device-specific attestation data. In some embodiments, the enhanced attestation object is used to verify that an execution environment of an application on the device is secure. In some embodiments, a device-specific risk score is generated based upon the device-specific attestation data and an enhanced attestation risk score is generated based on the enhanced attestation data analysis, the enhanced attestation risk score being used to verify that the execution environment of the application on the device is secure.

13 Claims, 7 Drawing Sheets

(56) References Cited

U.S. PATENT DOCUMENTS

| | | | |
|---|---|---|---|
| 2020/0021445 A1* | 1/2020 | Caceres | ................. G06F 21/44 |
| 2022/0179958 A1* | 6/2022 | Robison | ................. G06F 21/57 |

OTHER PUBLICATIONS

PCI Security Standards Council, LLC, Contactless Payments on COTS (CPoC) Security and Test Requirements, Dec. 2019, Version 1.0.

Nguyen Vu, Long & Chau, Ngoc-Tu & Kang, Seongeun & Jung, Souhwan, "Android Rooting: An Arms Race between Evasion and Detection", Security and Communication Networks, Oct. 29, 2017, 1-13. 10.1155/2017/4121765.

* cited by examiner

100

SYSTEM
102

ENHANCED END-POINT
ATTESTATION
COMPONENT
110

121

COMMUNICATION
NETWORK
109

SERVER
108

ENHANCED BACK-END
ATTESTATION
COMPONENT
120

134

SYSTEM
102

I/O INTERFACE
201

PROCESSOR(S)
202

NETWORK
INTERFACE
203

STORAGE INTERFACE
204

MEMORY
205

OS
207

PROCESSES
220

ENHANCED END-POINT ATTESTATION
COMPONENT
110

Figure 4:
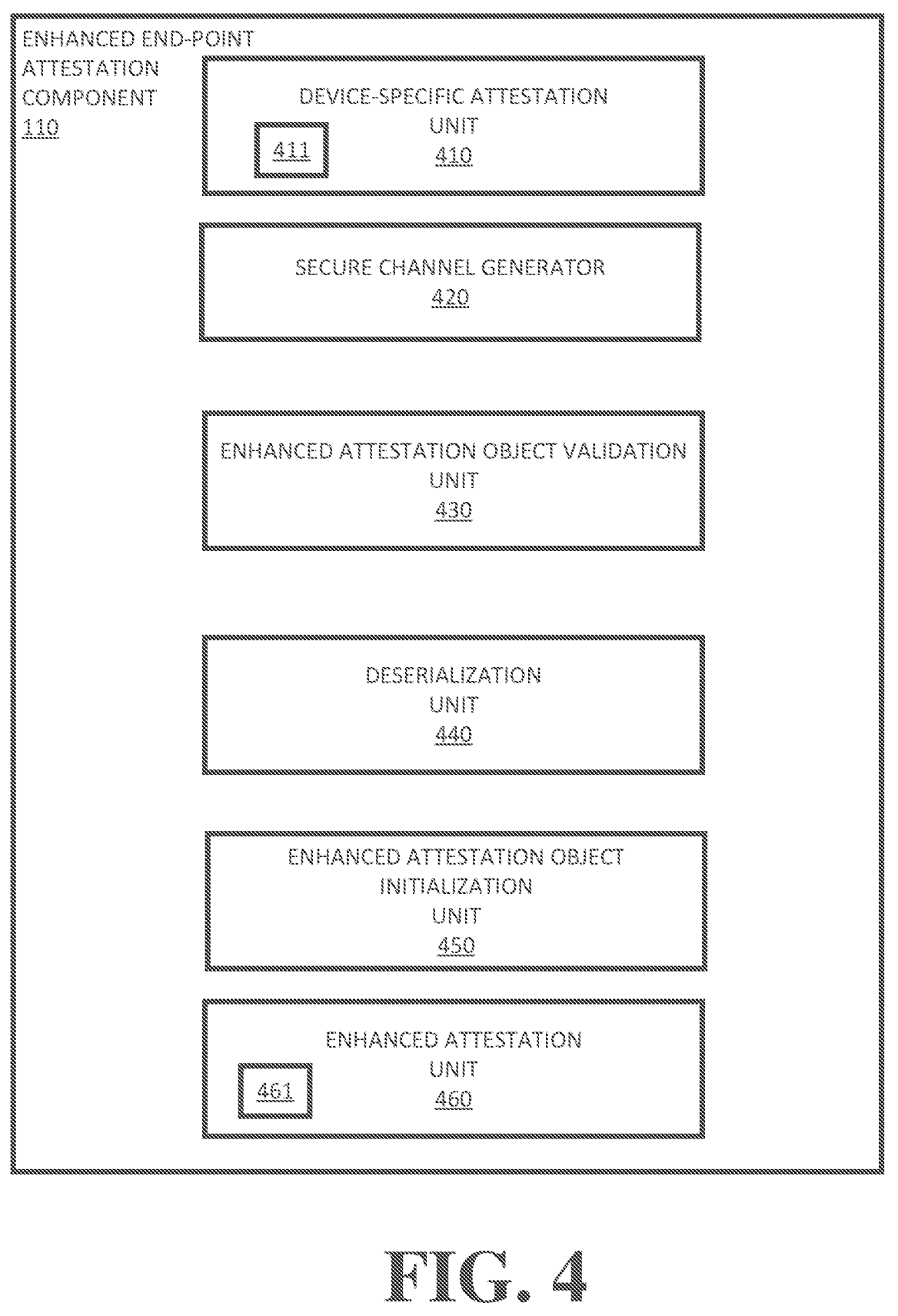

ENHANCED END-POINT
ATTESTATION
COMPONENT
110

DEVICE-SPECIFIC ATTESTATION
UNIT
410

411

SECURE CHANNEL GENERATOR
420

ENHANCED ATTESTATION OBJECT VALIDATION
UNIT
430

DESERIALIZATION
UNIT
440

ENHANCED ATTESTATION OBJECT
INITIALIZATION
UNIT
450

ENHANCED ATTESTATION
UNIT
460

Figure 5:
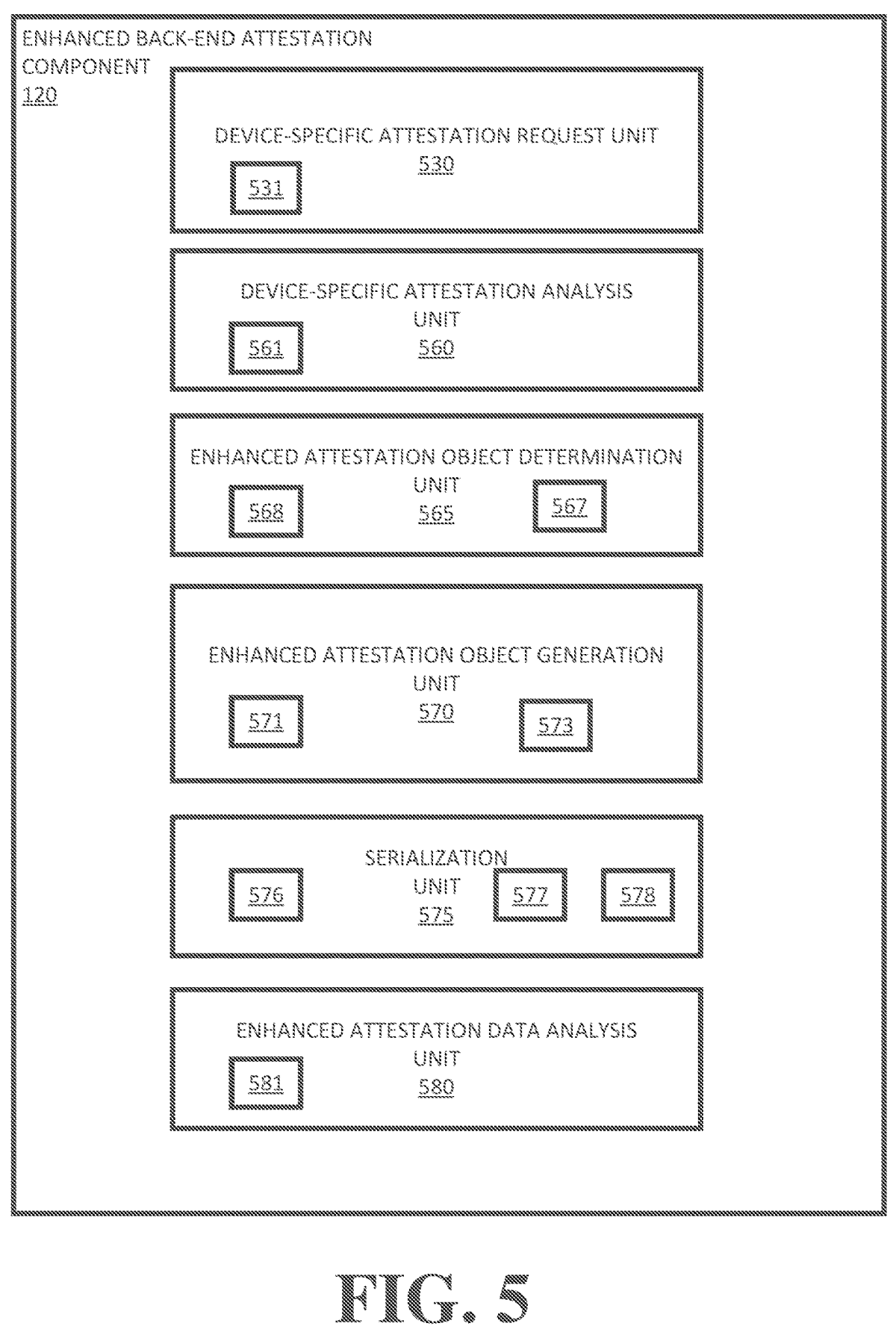

ENHANCED BACK-END ATTESTATION
COMPONENT
120

DEVICE-SPECIFIC ATTESTATION REQUEST UNIT
530

531

DEVICE-SPECIFIC ATTESTATION ANALYSIS
UNIT
560

561

ENHANCED ATTESTATION OBJECT DETERMINATION
UNIT
565

568                567

ENHANCED ATTESTATION OBJECT GENERATION
UNIT
570

571                573

SERIALIZATION
UNIT
575

576                577        578

ENHANCED ATTESTATION DATA ANALYSIS
UNIT
580

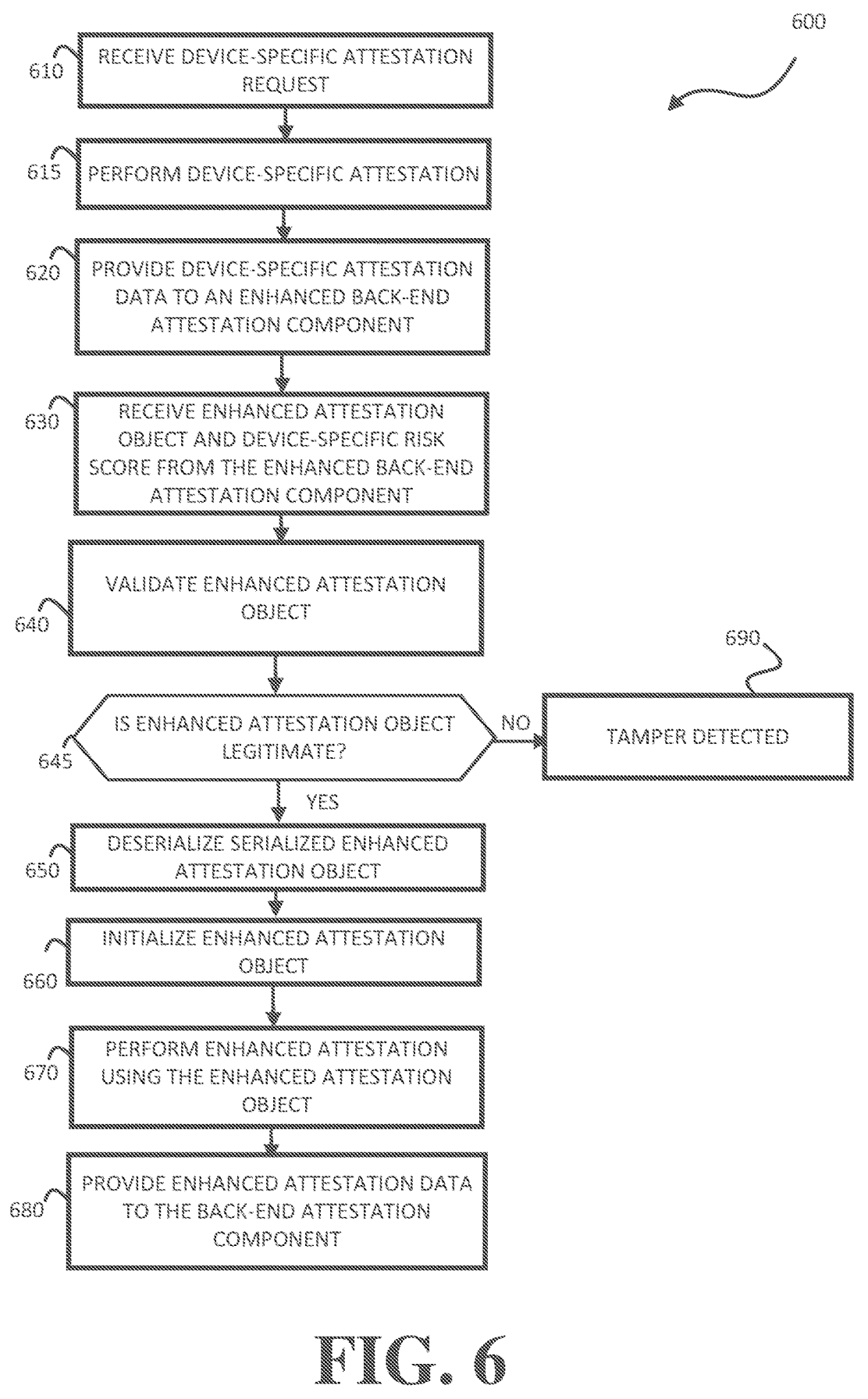

610 — RECEIVE DEVICE-SPECIFIC ATTESTATION REQUEST

615 — PERFORM DEVICE-SPECIFIC ATTESTATION

620 — PROVIDE DEVICE-SPECIFIC ATTESTATION DATA TO AN ENHANCED BACK-END ATTESTATION COMPONENT

630 — RECEIVE ENHANCED ATTESTATION OBJECT AND DEVICE-SPECIFIC RISK SCORE FROM THE ENHANCED BACK-END ATTESTATION COMPONENT

640 — VALIDATE ENHANCED ATTESTATION OBJECT

645 — IS ENHANCED ATTESTATION OBJECT LEGITIMATE? — NO → 690 TAMPER DETECTED

YES

650 — DESERIALIZE SERIALIZED ENHANCED ATTESTATION OBJECT

660 — INITIALIZE ENHANCED ATTESTATION OBJECT

670 — PERFORM ENHANCED ATTESTATION USING THE ENHANCED ATTESTATION OBJECT

680 — PROVIDE ENHANCED ATTESTATION DATA TO THE BACK-END ATTESTATION COMPONENT

FIG. 6

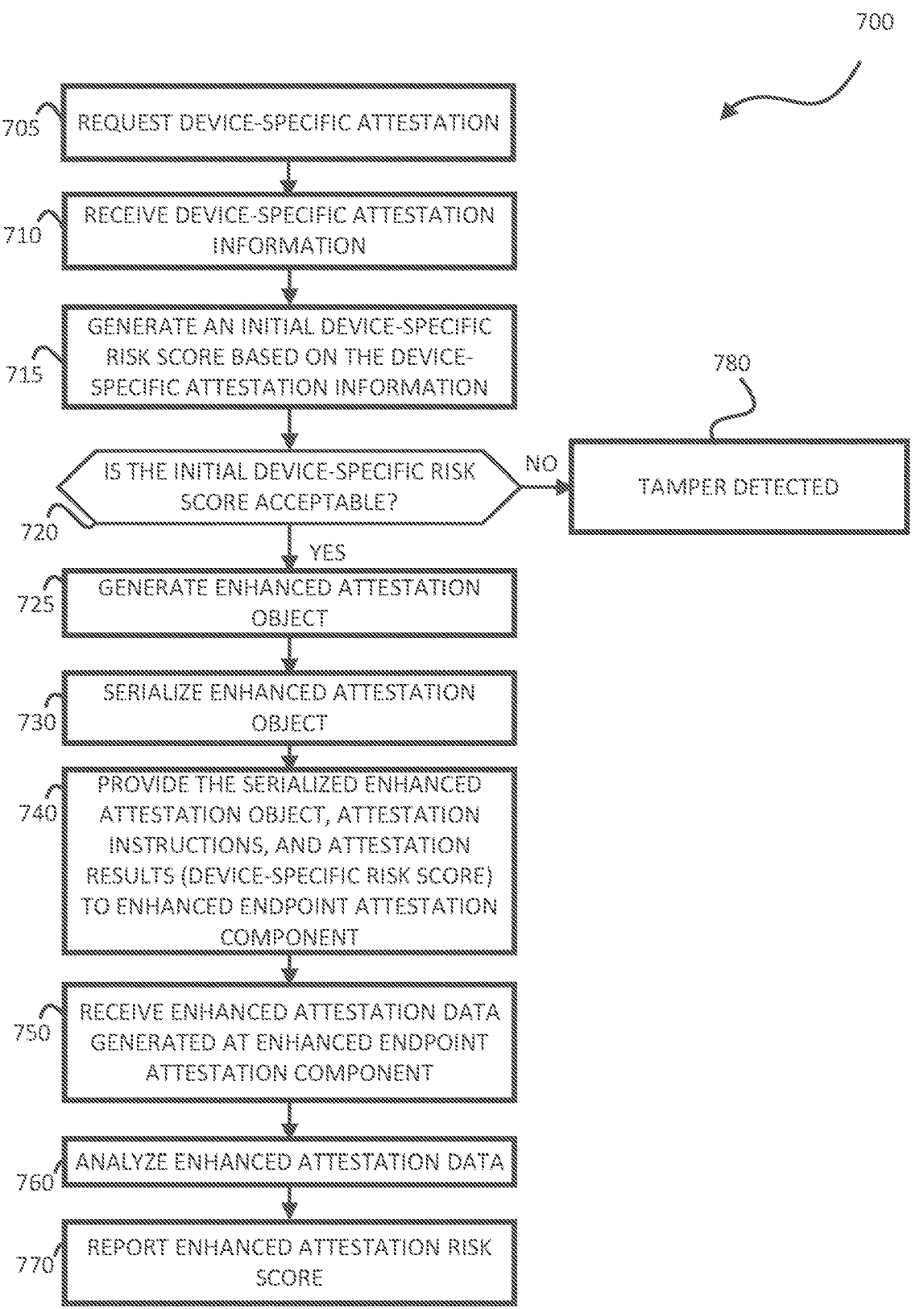

700

705 REQUEST DEVICE-SPECIFIC ATTESTATION

710 RECEIVE DEVICE-SPECIFIC ATTESTATION INFORMATION

715 GENERATE AN INITIAL DEVICE-SPECIFIC RISK SCORE BASED ON THE DEVICE-SPECIFIC ATTESTATION INFORMATION

720 IS THE INITIAL DEVICE-SPECIFIC RISK SCORE ACCEPTABLE? — NO → 780 TAMPER DETECTED

YES

725 GENERATE ENHANCED ATTESTATION OBJECT

730 SERIALIZE ENHANCED ATTESTATION OBJECT

740 PROVIDE THE SERIALIZED ENHANCED ATTESTATION OBJECT, ATTESTATION INSTRUCTIONS, AND ATTESTATION RESULTS (DEVICE-SPECIFIC RISK SCORE) TO ENHANCED ENDPOINT ATTESTATION COMPONENT

750 RECEIVE ENHANCED ATTESTATION DATA GENERATED AT ENHANCED ENDPOINT ATTESTATION COMPONENT

760 ANALYZE ENHANCED ATTESTATION DATA

770 REPORT ENHANCED ATTESTATION RISK SCORE

FIG. 7

SYSTEM AND METHOD FOR PERFORMING DEVICE ATTESTATION

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Software vendors that develop software applications for mobile devices are generally required to perform attestation of the software applications on the mobile devices to verify the security of the software applications. A challenge that software vendors face during the attestation process is that the attestation information that is required to be collected by attestation components during the attestation process is vast, varies between different types of execution environments, and must rapidly evolve to identify new vulnerabilities, recognize new threats, and align with the business functionality and security needs of the applications. Moreover, as rooting and evasion techniques continuously evolve, the attestation techniques used by the software vendors must be able to evolve with the new rooting and evasion techniques. Therefore, a need exists to provide improved attestation systems that provide efficient attestation capabilities and utilization of computer resources, while supporting different types of execution environments.

BRIEF DESCRIPTION OF THE DRAWINGS

FIG. 4 is a block diagram of an enhanced end-point attestation component of FIG. 1 in accordance with some embodiments.

FIG. 5 is a block diagram of an enhanced back-end attestation component of FIG. 1 in accordance with some embodiments.

FIG. 6 is a flow diagram illustrating a method for performing enhanced end-point attestation in accordance with some embodiments.

FIG. 7 is a flow diagram illustrating a method for performing enhanced back-end attestation in accordance with some embodiments.

DETAILED DESCRIPTION

Figure 1:
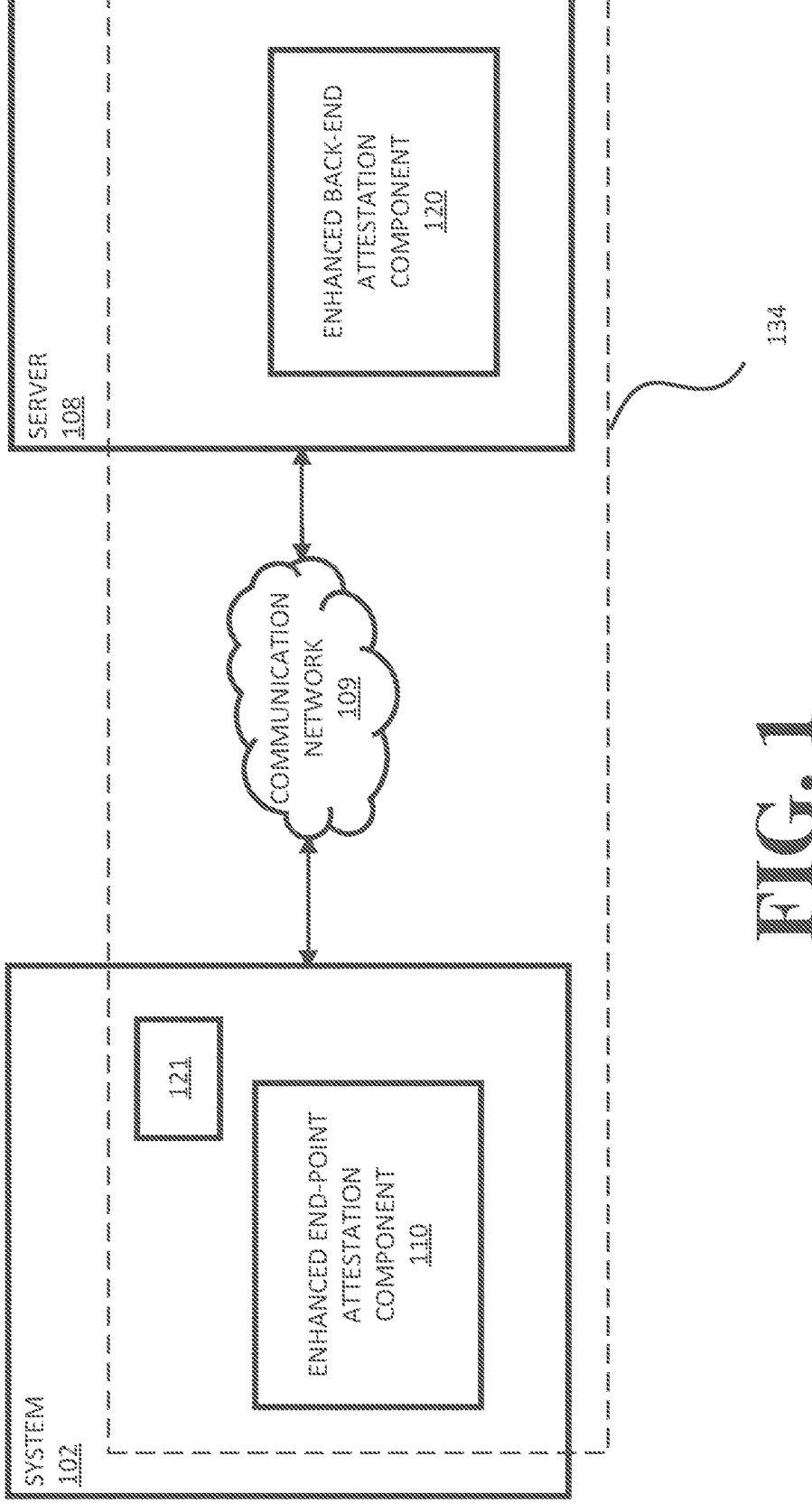
FIG. 1 is a block diagram of a universal attestation environment in accordance with some embodiments.

FIG. 1 illustrates a universal attestation environment 100 in accordance with some embodiments. In some embodiments, the universal attestation environment 100 includes a system 102 electronically coupled to a server 108 via communication network 109. In some embodiments, the system 102 includes an enhanced end-point attestation component 110 and the server 108 includes an enhanced back-end attestation component 120. In some embodiments, the enhanced back-end attestation component 120 and the enhanced end-point attestation component 110 are included in a universal attestation system 134. In some embodiments, the enhanced back-end attestation component 120 and the enhanced end-point attestation component 110 of universal attestation system 134 are collectively configured to utilize enhanced attestation to verify that an execution environment 121 of the system 102 is secure to execute an application on the system 102.

Figure 2:
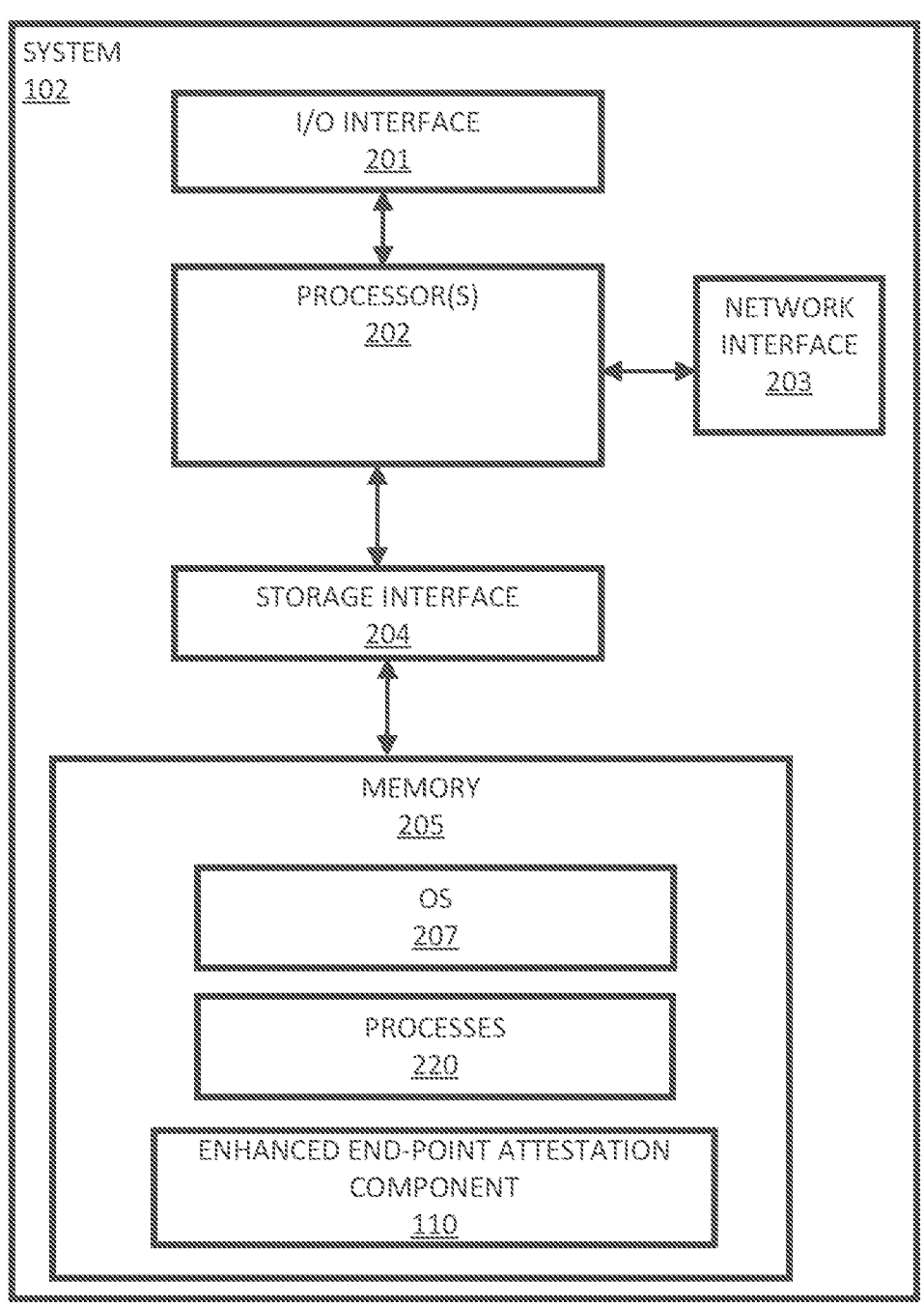
FIG. 2 is a block diagram of a system of FIG. 1 in accordance with some embodiments.
Figure 3:
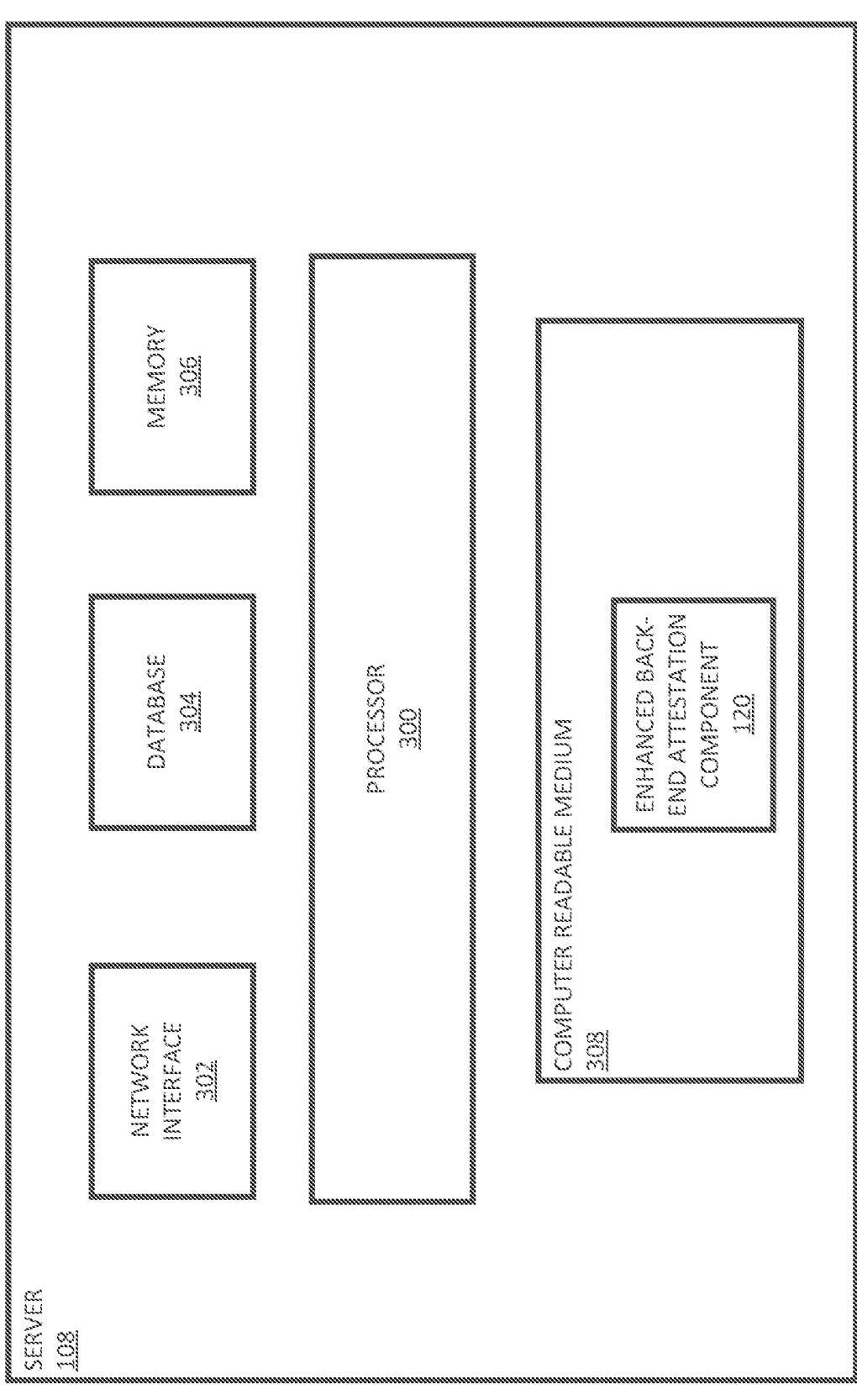
FIG. 3 is a block diagram of a server of FIG. 1 in accordance with some embodiments.

In some embodiments, the server 108 is configured to utilize an enhanced back-end attestation process as part of the universal attestation system 134 to verify the security of the execution environment 121 in the system 102 (described further herein with reference to FIG. 3, FIG. 5, and FIG. 7). In some embodiments, the system 102 is configured to utilize an enhanced end-point attestation process as part of the universal attestation system 134 to verify the security of the execution environment 121 in the system 102. In some embodiments, the enhanced back-end process and the enhanced end-point attestation process are utilized as part of the universal attestation system 134 to simplify the attestation process by utilizing a minimal amount of attestation information during the attestation process. For example, in some embodiments, the attestation process is minimized by the universal attestation system 134 by requesting device-specific attestation data from the system 102, using the device-specific attestation data to generate an enhanced attestation object, and using the enhanced attestation object to perform an enhanced attestation configured specifically for system 102 to verify the security of execution environment 121 (described further with reference to FIG. 2-FIG. 7). In some embodiments, because the universal attestation process provided by the universal attestation system 134 is tailored specifically for the system 102, the number of instructions required for attestation by system 102 is reduced and less processing power is required for executing attestation instructions in system 102. The universal attestation system 134 is described further herein with reference to FIG. 2-FIG. 7.

FIG. 2 illustrates a block diagram of an exemplary system 102 for implementing embodiments consistent with the present disclosure. In some nonlimiting embodiments or aspects, the system 102 may utilize an enhanced end-point attestation component 110 to implement a method for performing enhanced end-point attestation in system 102. In some embodiments, the system 102 may be a mobile device, a tablet, an internet-of-things (IOT) device, a computerized vehicle, a smart appliance, or some other type of computer system capable of performing the operations described herein. In some embodiments, the processor 202 may comprise at least one data processor for executing program components for dynamic resource allocation at run time. The processor 202 may include specialized processing units such as integrated system (bus) controllers, memory management control units, floating point units, graphics processing units, digital signal processing units, etc.

In some embodiments, the processors 202 may be disposed in communication with one or more input/output (I/O) devices (not shown) via an I/O interface 201. The I/O interface 201 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMi), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

In some embodiments, using the I/O interface 201, the system 102 may communicate with one or more I/O devices.

For example, an input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device 111 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processors 202 may be disposed in communication with the communication network 109 via a network interface 203. The network interface 203 may communicate with the communication network 109. The network interface 203 may employ connection protocols including, without limitation, direct connect, Ethernet (e.g., twisted pair 10/300/3000 Base T), transmission control protocol/Internet protocol (TCP/IP), token ring, IEEE 802.11a/b/g/n/x, etc. The communication network 109 may include, without limitation, a direct interconnection, e-commerce network, a peer to peer (P2P) network, local area network (LAN), wide area network (WAN), wireless network (e.g., using Wireless Application Protocol), the internet, Wi-Fi®, etc. Using the network interface 203) and the communication network 109, the system 102 may communicate with the one or more service operators.

In some non-limiting embodiments or aspects, the processors 202 may be disposed in communication with a memory 205 (e.g., RAM, ROM, etc.) via a storage interface 204. In some embodiments, the storage interface 204 may connect to memory 205 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

In some embodiments, the memory 205 may store a collection of program or database components, including, without limitation, a user interface, an operating system (e.g., operating system 207), processes (e.g., processes 220), a web server, etc. In some non-limiting embodiments or aspects, the system 102 may store user/application data, such as the data, variables, records, etc. as described in this disclosure. Such databases may be implemented as fault-tolerant, relational, scalable, secure databases such as Oracle or Sybase.

In some embodiments, the operating system 207 may facilitate resource management and operation of the system 102. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® OS®, GOOGLE™ ANDROID™, BLACK-BERRY® OS, or the like.

In some non-limiting embodiments or aspects, the system 102 may implement a web browser (not shown in the figures) stored program component. The web browser (not shown in the figures) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as MAX, DHTML, ADOBE® FLASH®, JAVASCRIPT®, JAVA®, Application Programming Interfaces (APIs), etc.

Furthermore, one or more computer-readable storage media may be utilized in implementing embodiments consistent with the present disclosure. In some embodiments, a computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

FIG. 3 illustrates a server 108 in accordance with some embodiments. In some nonlimiting embodiments or aspects, the server 108 may utilize an enhanced back-end attestation component 120 to implement a method for performing enhanced back-end attestation in server 108. In some embodiments, the server 108 may include a processor 300 operatively coupled to a network interface 302, a database 304, a memory 306 and a computer readable medium 308. In some embodiments, the server may be a system or computer system. In some embodiments, the computer readable medium 308 may include instructions or code, executable by the processor 300. The computer readable medium 308 may include the enhanced back-end attestation component 120.

In some embodiments, the network interface 302 may be configured to communicate with the system 102 and other entities (not shown) using one or more communications networks In some embodiments, the database 304 may be configured to store information associated with the system 102 and the consumer. For example, the database 304 may store payment account information associated with a wallet mobile application in system 102 (e.g., account numbers, expiration dates, issuer information, etc.), user personal information (e.g, name, address, phone number, etc.)

In some embodiments, the memory 306 may be configured to store enhanced end-point attestation data and associated enhanced end-point attestation instructions and enhanced back-end attestation data and associated back-end attestation instructions for different software components associated with different devices or systems such as, for example, system 102. The memory 306 be a non-volatile memory that can retain the data and associated information in the absence of power. In some embodiments, the memory 306 may also store the code associated with system 102, such as, for example, enhanced end-point attestation component 110 of system 102.

FIG. 4 illustrates enhanced end-point attestation component 110 of FIG. 1 in accordance with some embodiments. FIG. 5 illustrates enhanced back-end attestation component 120 in accordance with some embodiments. In some embodiments, enhanced end-point attestation component 110 and enhanced back-end attestation component 120 are software components collectively configured to verify the security of execution environment 121 in system 102 of the universal attestation environment 100. In some embodiments, with reference to FIG. 4, enhanced end-point attestation component 110 includes a device-specific attestation unit 410, a secure channel generator 420, an enhanced attestation object validation unit 430, a deserialization unit 440, an enhanced attestation object initialization unit 450, and an enhanced attestation unit 460. In some embodiments, with reference to FIG. 5, enhanced back-end attestation component 120 includes a device-specific attestation request unit 530, a device-specific attestation analysis unit 560, an enhanced attestation object determination unit 565, an enhanced attestation object generation unit 570, a serialization unit 575, and an enhanced attestation data analysis unit 580.

In some embodiments, in operation of the universal attestation system 134, device-specific attestation request unit 530 requests a device-specific attestation of the execution environment 121 of system 102. In some embodiments, a device-specific attestation is an attestation of a device, such as for example, system 102, that includes only basic information related to the execution environment of the device. In some embodiments, the basic information of the execution environment 121 includes, for example, a device type of the system 102, a version of the operating system 207 of the system 102, and a build number of the operating system 207 of the system 102. In some embodiments, device-specific attestation request unit 530 requests the device-specific attestation by using a device-specific attestation request 531. In some embodiments, the device-specific attestation request 531 is an attestation request that requests only the basic information of the execution environment 121 of system 102. In some embodiments, the device-specific attestation request unit 530 provides the device-specific attestation request 531 to device-specific attestation unit 410 of enhanced end-point attestation component 110.

In some embodiments, the device-specific attestation unit 410 receives the device-specific attestation request 531 from device-specific attestation request unit 530 and commences the enhanced end-point attestation process. In some embodiments, device-specific attestation unit 410 is software configured to perform a device-specific attestation of the execution environment 131 and generate device-specific attestation data 411 for enhanced back-end attestation processing by enhanced back-end attestation component 120. In some embodiments, device-specific attestation unit 410 performs the device-specific attestation associated with the device-specific attestation request 531 and provides the resulting device-specific attestation data 411 to device-specific attestation analysis unit 560 of enhanced back-end attestation component 120 via a secured channel established by secure channel generator 420.

In some embodiments, device-specific attestation analysis unit 560 receives the device-specific attestation data 411 from device-specific attestation unit 410 and performs a device-specific attestation analysis of the device-specific attestation data 411. In some embodiments, as part of the device-specific attestation analysis, device-specific attestation analysis unit 560 calculates a device-specific risk score 561 indicative of a threat risk of the device-specific attestation data 411 and the associated execution environment 121 of the system 102. In some embodiments, device-specific attestation analysis unit 560 provides the device-specific risk score 561 to enhanced attestation object determination unit 565 for further enhanced back-end attestation processing.

In some embodiments, enhanced attestation object determination unit 565 receives the device-specific attestation data 411 and/or the device-specific risk score 561 from device-specific attestation analysis unit 560 and commences the process of determining whether to generate an enhanced attestation object 571 for further enhanced end-point processing by enhanced end-point attestation component 110. In some embodiments, enhanced attestation object determination unit 565 is software configured to assess the device-specific attestation data 411 and/or the device-specific risk score 561 to determine whether the enhanced attestation object generation unit 570 should generate the enhanced attestation object 571 for use by enhanced end-point attestation component 110. In some embodiments, the enhanced attestation object determination unit 565 utilizes an end-point identifier to determine whether the device-specific risk score 561 is acceptable. In some embodiments, the enhanced attestation object determination unit 565 utilizes an enhancement attestation object threshold 567 to determine whether the device-specific risk score 561 is acceptable. In some embodiments, in order to determine whether the device-specific risk score 561 is acceptable or not acceptable, enhanced attestation object determination unit 565 performs a comparison of the device-specific risk score 561 to the enhancement attestation object threshold 567.

In some embodiments, when, as a result of the comparison, the enhanced attestation object determination unit 565 determines that the device-specific risk score 561 is not greater than the enhancement attestation object threshold 567, the enhanced attestation object determination unit 565 does not send a generate enhanced attestation object request 568 to enhanced attestation object generation unit 570 to generate enhanced attestation object 571, and generates a tamper detected flag, e.g., a tamper detection is initiated and no request for the enhanced attestation object is sent (described further below with reference to FIG. 7). In some embodiments, when the enhanced attestation object determination unit 565 determines that the device-specific risk score 561 is greater than the enhancement attestation object threshold 567, the enhanced attestation object determination unit 565 provides the generate enhanced attestation object request 568 to enhanced attestation object generation unit 570 to generate enhanced attestation object 571.

In some embodiments, enhanced attestation object generation unit 570 receives the generate enhanced attestation object request 568 from enhanced attestation object determination unit 565 and generates the enhanced attestation object 571. In some embodiments, the enhanced attestation object 571 is an object that includes additional device-specific attestation functionality tailored to be performed by enhanced end-point attestation component 110. In some embodiments, because the enhanced back-end attestation component 120 is configured to perform a device-specific attestation analysis and assessment of the device-specific attestation data early in the enhanced attestation process, enhanced back-end attestation component 120 is able to tailor enhanced attestation instructions provided to the enhanced end-point attestation component 110 specifically for the execution environment 121 of the system 102.

In some embodiments, in addition to the enhanced attestation object 571, the enhanced attestation instructions 573 associated with the enhanced attestation object 571 are provided to enhanced end-point attestation component 110. In some embodiments, as stated previously, the enhanced attestation instructions 573 are additional enhanced attestation instructions that map to the enhanced attestation object 571 and are tailored to be performed by the enhanced end-point attestation component 110.

In some embodiments, enhanced attestation object generation unit 570 provides the enhanced attestation object 571, the enhanced attestation instructions 573, and the device-specific risk score 561 (via device-specific attestation analysis unit 560) to serialization unit 575. In some embodiments, the serialization unit 575 serializes the enhanced attestation object 571, the enhance attestation instructions 573, and the device-specific risk score 561, and provides the serialized enhanced attestation object 576, the serialized enhanced attestation instructions 577, and the serialized device-specific risk score 578 to enhanced attestation object validation unit 430 of enhanced end-point attestation component 110.

In some embodiments, enhanced attestation object validation unit 430 receives the serialized enhanced attestation object 576, the serialized enhanced attestation instructions 577, and the serialized device-specific risk score 578 and commences the enhanced attestation object validation process. In some embodiments, the enhanced attestation object validation unit 430 is software configured to validate the enhanced attestation object by, for example, verifying a digital signature associated with the enhanced attestation object 571, performing a checksum procedure of the enhanced attestation object 571, and verifying the class type of enhanced attestation object 571. In some embodiments, after the enhanced attestation object 571 has been verified by the enhanced attestation object validation unit 430, enhanced attestation object validation unit 430 provides the serialized enhanced attestation object 576, the serialized enhanced attestation instructions 577, and the serialized device-specific risk score 578 to deserialization unit 440.

In some embodiments, the deserialization unit 440 receives the serialized enhanced attestation object 576, the serialized enhanced attestation instructions 577, and the serialized device-specific risk score 578 and provides a deserialized enhanced attestation object 571 to enhanced attestation object initialization unit 450. In some embodiments, enhanced attestation object initialization unit 450 receives the deserialized enhanced attestation object 571, the deserialized enhanced attestation instructions 573, and the deserialized device-specific risk score 561, and initializes the deserialized enhanced attestation object 571 for use by enhanced attestation unit 460. In some embodiments, after the enhanced attestation object initialization unit 450 initializes the deserialized enhanced attestation object 571, the enhanced attestation object initialization unit 450 provides the initialized enhanced attestation object 571 to enhanced attestation unit 460.

In some embodiments, enhanced attestation unit 460 receives the initialized and deserialized enhanced attestation object 571 and enhanced attestation instructions 573 and commences the process of performing the enhanced attestation represented by the enhanced attestation object 571 and the associated enhanced attestation instructions 573. In some embodiments, the enhanced attestation unit 460 is software configured to perform the enhanced attestation represented by enhanced attestation instructions 573 and enhanced attestation object 571 (i.e., the enhanced attestation functionality). In some embodiments, as a result of the enhanced attestation performed by the enhanced attestation unit 460, the enhanced attestation unit 460 generates enhanced attestation data 451 associated with the enhanced attestation instructions 573 and the execution environment 121. In some embodiments, enhanced attestation unit 460 provides the enhanced attestation data 451 to an enhanced attestation data analysis unit 580 of enhanced back-end attestation component 120. In some embodiments, in addition to the enhanced attestation data 451, additional system information and an additional device-specific risk score may be provided to the enhanced attestation data analysis unit 580.

In some embodiments, enhanced attestation data analysis unit 580 receives the enhanced attestation data 461 and generates an enhanced attestation risk score 581. In some embodiments, the enhanced attestation risk score 581 is a risk score indicative of the security of the execution environment 121 of system 102, e.g., whether the execution environment 121 of the enhanced end-point attestation component 110 is secure for further processing. In some embodiments, the enhanced attestation data analysis unit 580 is software configured to utilize the enhanced attestation data 451 to perform an enhanced attestation analysis of the enhanced attestation data and generate the associated enhanced attestation risk score 581. In some embodiments, enhanced back-end attestation component 120 uses the enhanced attestation risk score 581 to confirm or deny access to applications running on the execution environment of system 102.

FIG. 6 is a flow diagram illustrating a method 600 for performing end-point attestation in a universal attestation system 134 in accordance with some embodiments. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, the method 600 is described with reference to FIG. 1-FIG. 7.

In some embodiments, at block 610, device-specific attestation unit 410 receives a device-specific attestation request 531 from device-specific attestation request unit 530 of the enhanced back-end attestation component 120. In some embodiments, at block 615, device-specific attestation unit 410 performs a device-specific attestation of the execution environment 121 of system 102 that generates device-specific attestation data 411. In some embodiments, at block 620, device-specific attestation unit 410 provides the device-specific attestation data 411 to device-specific attestation analysis unit 560 of enhanced back-end attestation component 120 via a secure channel generated by secure channel generator 420. In some embodiments, establishing the secure channel may require mutual-authentication and communication of a cryptographic material to allow the back-end of the universal attestation system 134 (e.g., server 108) to uniquely identify the end-point of the universal attestation system 134 (e.g., system 102). In some embodiments, in addition to the device-specific attestation data 411, device-specific attestation unit 410 provides sufficient information to identify enhanced end-point attestation component 110 or an attestation requestor (e.g., mobile payment solution).

In some embodiments, at block 630, enhanced attestation object validation unit 430 receives serialized enhanced attestation object 576, serialized enhanced attestation instructions 577, and serialized device-specific risk score 578 from the serialization unit 575 of enhanced back-end attestation component 120. In some embodiments, at block 640, enhanced attestation object validation unit 430 validates the serialized enhanced attestation object 576.

In some embodiments, at block 645, enhanced attestation object validation unit 430 determines whether the serialized enhanced attestation object 576 is legitimate or not legitimate. In some embodiments, at block 690, when enhanced attestation object validation unit 430 determines that the serialized enhanced attestation object 576 is not legitimate, the enhanced end-point attestation component 110 performs tamper detection operations to generate a tamper detection notice. In some embodiments, for example, the enhanced end-point attestation component 110 notifies enhanced back-end attestation component 120 that the serialized enhanced attestation object 576 is not legitimate. In some embodiments, at block 650, when enhanced attestation object validation unit 430 determines that the serialized enhanced attestation object 576 is legitimate, deserialization unit 440 deserializes and instantiates serialized enhanced attestation object 576, serialized enhanced attestation instructions 577, and serialized device-specific risk score 578 to recover enhanced attestation object 571, enhanced attestation instruction 573, and device-specific risk score 561. In some embodiments, deserialization unit 440 deserializes and instantiates the serialized enhanced attestation object 576, serialized enhanced attestation instructions 577, and serialized device-specific risk score 578 to extend the end-point attestation capability without requiring interaction or intervention from an end-user of the system 102.

In some embodiments, at block 660, enhanced attestation object initialization unit 450 initializes the enhanced attestation object 571. In some embodiments, at block 670, enhanced attestation unit 460 performs the enhanced attestation associated with the enhanced attestation object 571. In some embodiments, the enhanced attestation is performed according to the received enhanced attestation instructions 573. In some embodiments, at block 680, enhanced attestation unit 460 provides enhanced attestation data 461 to enhanced back-end attestation component 120 for enhanced attestation data analysis.

FIG. 7 is a flow diagram illustrating a method 700 for performing back-end attestation in a universal attestation system 134 in accordance with some embodiments. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, the steps described herein may be repeated as instructed by the enhanced attestation instructions 573 and received configurations. In some embodiments, the method 700 is described with reference to FIG. 1-FIG. 7.

In some embodiments, at block 705, device-specific attestation request unit 530 requests, using a device-specific attestation request 531, a device-specific attestation of the execution environment 121 of system 102 from enhanced end-point attestation component 110.

In some embodiments, at block 710, device-specific attestation analysis unit 560 of enhanced back-end attestation component 120 receives device-specific attestation data 411 from device-specific attestation unit 410 of enhanced end-point attestation component 110.

In some embodiments, at block 715, device-specific attestation analysis unit 560 generates a device-specific risk score 561 and provides the device-specific risk score 561 to enhanced attestation object determination unit 564. In some embodiments, at block 720, enhanced attestation object determination unit 564 determines whether the device-specific risk score 561 is acceptable or not acceptable. In some embodiments, at block 780, when the enhanced attestation object determination unit 564 determines that the device-specific risk score 561 is not acceptable, the enhanced attestation object determination unit 564 flags the device-specific attestation corresponding to the device-specific risk score 561 as failing and provides tamper detection notice to enhanced end-point attestation component 110.

In some embodiments, at block 725, when the enhanced attestation object determination unit 564 determines that the device-specific risk score 561 is acceptable, the enhanced attestation object generation unit 570 generates an enhanced attestation object 571 and provides the enhanced attestation object 571 and the associated enhanced attestation instructions 573 to serialization unit 575. In some embodiments, at block 730, serialization unit 575 serializes the enhanced attestation object 571, the enhanced attestation instructions 573, and optionally the device-specific risk score 561, to generate a serialized enhanced attestation object 576, serialized enhanced attestation instructions 577, and serialized device-specific risk score 578.

In some embodiments, at block 740, serialization unit 575 provides the serialized enhanced attestation object 576, the serialized enhanced attestation instructions 577, and the serialized device-specific risk score 578 to enhanced end-point attestation component 110. In some embodiments, at block 750, enhanced attestation data analysis unit 580 of enhanced back-end attestation component 120 receives enhanced attestation data 461 from enhanced end-point attestation component 110. In some embodiments, at block 760, enhanced attestation data analysis unit 580 analyzes the enhanced attestation data 461 and generates an enhanced attestation risk score 581, which is a risk score indicative of the threat risk of the execution environment 121 of system 102. In some embodiments, at block 770, the enhanced attestation data analysis unit 580 reports the enhanced attestation risk score 581 to, for example, end-point applications in enhanced end-point attestation component 110, device-specific attestation request unit 530 of enhanced back-end attestation component 120, or an attestation requestor (e.g., end-point application and services) external to the enhanced back-end attestation component 120 and enhanced end-point attestation component 110.

In some embodiments, the device-specific attestation (e.g., a minimal attestation) performed by device specification attestation unit 410 may include functions that access data that are common across multiple devices and operating systems, such as, for example, information about the device type, and the version and the build number of the operating system and, are sufficient to gain a superficial assurance of the security of the execution environment 121. In some embodiments, the enhanced attestation performed by enhanced attestation unit 460 includes additional functionality that is customized to the specific device type, the version of the operating system, and the specific needs of the attestation requestor (e.g., back-end attestation component or other attestation requestor). In some embodiments, the attestation requestor may be, for example, a server, computing system, or other electronic device or application configured to request an attestation from, for example, enhanced end-point attestation component 110. In some embodiments, the attestation requestor is configured to interact with the universal attestation system 134 to request an attestation from, for example, enhanced end-point attestation component 110.

In some embodiments, to minimize the size of the end-point attestation component 110, the end-point attestation may include only basic functionality to, for example, perform minimal attestation, establish a secure communication channel with the back-end attestation component 120 to securely convey device-specific attestation data and enhanced attestation data, receive enhanced attestation instructions, provide extended attestation functionality, invoke the extended attestation functionality, and report attestation results/score to an attestation requestor.

In some embodiments, the enhanced attestation object 571 is customized to the type and version of the execution environment 121 and is created and conveyed by the enhanced back-end attestation component 120 to the enhanced end-point device (e.g., system 102). In some embodiments, at the end-point device (e.g., system 102), the enhanced end-point attestation component 110 instantiates the received enhanced attestation object 571 and invokes the enhanced attestation functionality to collect enhanced attestation data 461 specific to the end-point device (e.g., system 102) and the end-point device operating system (e.g., operating system 207).

In some embodiments, the methods described herein allow the enhanced attestation system to rapidly convey updated enhanced attestation functionality to the enhanced end-point attestation component 110, without end-user intervention, that is specifically customized to the unique requirements of the attestation requestor, the type and version of the end-point operating system (e.g., operating system 207), and any information required to be collected to identify fingerprints of possible threats and exploits to the execution environment 121. In some embodiments, there are multiple techniques that may be used to convey the additional enhanced attestation functionality to the end-point attestation component, such as, for example, object serialization and deserialization, using referenceable objects, Java Remote Method Invocation (JRMI) and language-independent Common Object Request Broker Architecture (CO-BRA) framework.

In some embodiments, as stated previously, based on the device-specific attestation analysis of the received device-specific attestation data 411, the enhanced back-end attestation component 120 calculates the initial device-specific risk score 561 and, based on an end-point identifier, determines whether the device-specific risk score 561 is an acceptable device-specific risk score 561 using the enhancement attestation object threshold 567. In some embodiments, various attestation requestors may have a unique enhancement attestation object threshold 567 required for the device-specific risk score 561. In some embodiments, when the device-specific risk score 561 acceptable, the enhanced back-end attestation component creates and serializes the enhanced attestation object 571 with the capability to perform additional attestation checks as required by the attestation requestor. For example, some attestation requesters may require additional functionality to access a list of all installed applications on the end-point device (e.g., system 102), while other attestation requestors may require information about installed applications with near-field communication (NFC) permissions. In some embodiments, the enhanced attestation functionality may be specifically customized to the type of the enhanced end-point device, the version and build of the end-point device operating system 207, and the specific requirements of the attestation requestor.

In some embodiments, based on the unique attestation requirements of the attestation requestor, the end-point (e.g., system 102) may create specific attestation instructions (e.g., configurations) which may include specific events or time-intervals when the attestation has to be executed on the end-point device (e.g., system 102), such as, for example, at start-up of the application, when the end-point is losing or gaining focus, or at every 30 minute interval, etc.

In some embodiments, the enhanced back-end attestation component 120 is configured to serialize the enhanced attestation object 571 that implements the enhanced attestation object interface and meets the requirements of the attestation requestor and the enhanced end-point platform. In some embodiments, as stated previously, the serialized enhanced attestation object 576 and the serialized enhanced attestation instructions 577 are conveyed through a secure channel to the enhanced end-point attestation component 110. In some embodiments, upon receiving the serialized enhanced attestation object 576 and the enhanced attestation instructions 577, the enhanced end-point attestation component 110 performs a validation of the serialized enhanced attestation object 576 to confirm the integrity of the enhanced attestation object 571. In some embodiments, the serialized enhanced attestation object 576 is deserialized, and a new object instance is created on the enhanced end-point initialized with the enhanced attestation instructions 573 received from the enhanced back-end (e.g., server 108). In some embodiments, the enhanced end-point attestation component 110 has the ability perform additional required enhanced attestation by invoking the appropriate method of the enhanced attestation object 571. In some embodiments, the collected enhanced attestation data 461 and corresponding enhanced attestation signals are sent to the enhanced back-end attestation component 120, over a secure channel, to perform the enhanced attestation data analysis and calculate the enhanced attestation risk score 581. In some embodiments, the process may be repeated as required by the enhanced attestation instructions. In some embodiments, the enhanced back-end attestation component 120 is configured to refresh and update the serialized enhanced attestation object 571 as required by, for example, the enhanced back-end attestation component 120.

In some embodiments, a method includes requesting, using a device-specific attestation request, a device-specific attestation of a device; receiving, from the device via a secure communication channel, device-specific attestation data associated with the device-specific attestation; generating an enhanced attestation object based on the device-specific attestation data; and using the enhanced attestation object to verify that an execution environment of an application on the device is secure.

In some embodiments the method includes, generating a device-specific risk score based upon the device-specific attestation data.

In some embodiments the method includes, determining whether the device-specific risk score is an acceptable device-specific risk score.

In some embodiments the method includes, generating the enhanced attestation object when the device-specific risk score is the acceptable device-specific risk score.

In some embodiments the method includes, providing a serialized version of the enhanced attestation object to an end-point attestation component.

In some embodiments the method includes, receiving enhanced attestation data from the end-point attestation component.

In some embodiments of the method, the enhanced attestation data was generated by the end-point attestation component using the enhanced attestation object.

In some embodiments the method includes, using the enhanced attestation data to conduct an enhanced attestation data analysis.

In some embodiments the method includes, generating an enhanced attestation risk score based on the enhanced attestation data analysis, the enhanced attestation risk score being used to verify that the execution environment of the application on the device is secure.

In some embodiments, a method includes receiving, at a device, a device-specific attestation request; performing a device-specific attestation based upon the device-specific attestation request; providing, via a secure communication channel, device-specific attestation data to a back-end attestation component; and performing an enhanced attestation at the device based upon an enhanced attestation object generated using the device-specific attestation data, wherein the enhanced attestation object having been used to verify that an execution environment of an application on the device is secure.

In some embodiments the method includes, receiving the enhanced attestation object from the back-end attestation component.

In some embodiments the method includes, validating the enhanced attestation object using an enhanced attestation object validation unit.

In some embodiments the method includes, determining whether the enhanced attestation object is a legitimate enhanced attestation object.

In some embodiments of the method, when the enhanced attestation object is the legitimate enhanced attestation object, deserializing the enhanced attestation object. initializing a deserialized version of the enhanced attestation object.

In some embodiments the method includes, initializing the deserialized version of the enhanced attestation object.

In some embodiments the method includes, generating an enhanced attestation risk score based on an enhanced attestation data analysis, the enhanced attestation risk score being used to verify that the execution environment of the application on the device is secure.

In some embodiments, a system includes a processor; and a non-transitory computer readable medium coupled to the processor, the non-transitory computer readable medium comprising code that: requests, using a device-specific attestation request, a device-specific attestation of a device; receives, via a secure communication channel, device-specific attestation data from the device as a result of the device-specific attestation; and generates an enhanced attestation object based on the device-specific attestation data, wherein the enhanced attestation object is used to verify that an execution environment of an application on the device is secure.

In some embodiments of the system, a device-specific risk score is generated based upon the device-specific attestation data.

In some embodiments of the system, the enhanced attestation object is generated when the device-specific risk score is a acceptable device-specific risk score.

In some embodiments of the system, an enhanced attestation risk score is generated based on an enhanced attestation data analysis, the enhanced attestation risk score being used to verify that the execution environment of the application on the device is secure.

What is claimed is:

1. A method, comprising:
utilizing a server that includes a back-end attestation component, the server requesting, using the back-end attestation component, an attestation from a mobile device;
receiving, from the mobile device via a secure communication channel in a universal attestation system, mobile device attestation data;

performing, at the server using the back-end attestation component, an analysis of the attestation data;
using the analysis to generate a risk score for a mobile device execution environment;
utilizing the risk score to determine whether to generate a back-end-based attestation object;
based upon an affirmative determination, generating, at a back-end of the universal attestation system, the back-end-based attestation object;
tailoring, at the server, attestation instructions;
utilizing the risk score to verify that the mobile device execution environment is secure to execute an application on the mobile device,
wherein the attestation instructions are tailored to the back-end-based attestation object based on (i) a device type of the mobile device, (ii) a version of an operating system of the mobile device, and (iii) attestation-requestor-specific requirements, the attestation instructions being mapped to the back-end-based attestation object; and
serializing, at the back-end of the universal attestation system, the back-end-based attestation object, the mapped attestation instructions, and the risk score as a combined serialized package.

2. The method of claim 1, further comprising:
confirming or denying, at the back-end of the universal attestation system, access to the application executing at the mobile device execution environment of the mobile device at an end-point of the universal attestation system based on a security of a mobile device execution environment risk score, the security of the mobile device execution environment risk score being a second risk score generated at an enhanced attestation data analysis unit located at the back-end.

3. The method of claim 2, further comprising:
providing a serialized back-end-based attestation object, a serialized-back-end-based attestation instructions, and a serialized risk score to the end-point for attestation object validation.

4. The method of claim 3, further comprising:
validating, at the end-point of the universal attestation system, the serialized back-end-based attestation object by verifying a digital signature associated with the back-end-based attestation object, performing a checksum procedure of the back-end-based attestation object, and verifying a class type of the back-end-based attestation object.

5. The method of claim 4, further comprising:
performing, at the end-point of the universal attestation system, an end-point-based-back-end-based attestation object attestation of the mobile device based upon utilizing a deserialized back-end-based attestation object and deserialized-back-end-based attestation instructions.

6. The method of claim 5, wherein:
the serialized back-end-based attestation object, the serialized-back-end-based attestation instructions, and the serialized risk score are deserialized at the end-point of the universal attestation system.

7. The method of claim 6, wherein:
the deserialization is configured to extend end-point attestation capability without requiring interaction from an end-user of the mobile device.

8. The method of claim 7, wherein:
the affirmative determination that the back-end-based attestation object is to be generated at the back-end of the universal attestation system is generated using a back-end attestation object threshold.

9. The method of claim 8, wherein:

the risk score is compared to the back-end attestation object threshold in order to determine whether to generate the back-end-based attestation object.

10. A system, comprising:

a processor; and a non-transitory computer readable medium coupled to the processor, the non-transitory computer readable medium comprising code that:

requests, using a back-end attestation component included in a server, an attestation from a mobile device;

receives, from the mobile device via a secure communication channel in a universal attestation system, mobile device attestation data;

performs, at the server using the back-end attestation component, an analysis of the attestation data;

uses the analysis to generate a risk score for a mobile device execution environment;

utilizes the risk score to determine whether to generate a back-end-based attestation object;

based upon an affirmative determination, generates, at a back-end of the universal attestation system, the back-end-based attestation object;

tailors, at the server, attestation instructions;

utilizes the risk score to verify that the mobile device execution environment is secure to execute an application on the mobile device, wherein the attestation instructions are tailored to the back-end-based attestation object based on (i) a device type of the mobile device, (ii) a version of an operating system of the mobile device, and (iii) attestation-requestor-specific requirements, the attestation instructions being mapped to the back-end-based attestation object; and serializes, at the back-end of the universal attestation system, the back-end-based attestation object, the mapped attestation instructions, and the risk score as a combined serialized package.

11. The system of claim 10, wherein:

confirming or denying access to the application executing at the mobile device execution environment of the mobile device at an end-point of the universal attestation system is based on a security of a mobile device execution environment risk score, the security of the mobile device execution environment risk score being a second risk score generated at an enhanced attestation data analysis unit.

12. The system of claim 11, wherein:

the processor provides a serialized back-end-based attestation object, a serialized-back-end-based attestation instructions, and a serialized risk score to the end-point for attestation object validation.

13. The system of claim 12, wherein:

the serialized back-end-based attestation object is validated at the end-point of the universal attestation system by verifying a digital signature associated with the back-end-based attestation object, performing a checksum procedure of the back-end-based attestation object, and verifying a class type of the back-end-based attestation object.

* * * * *